UNITED STATES PATENT OFFICE.

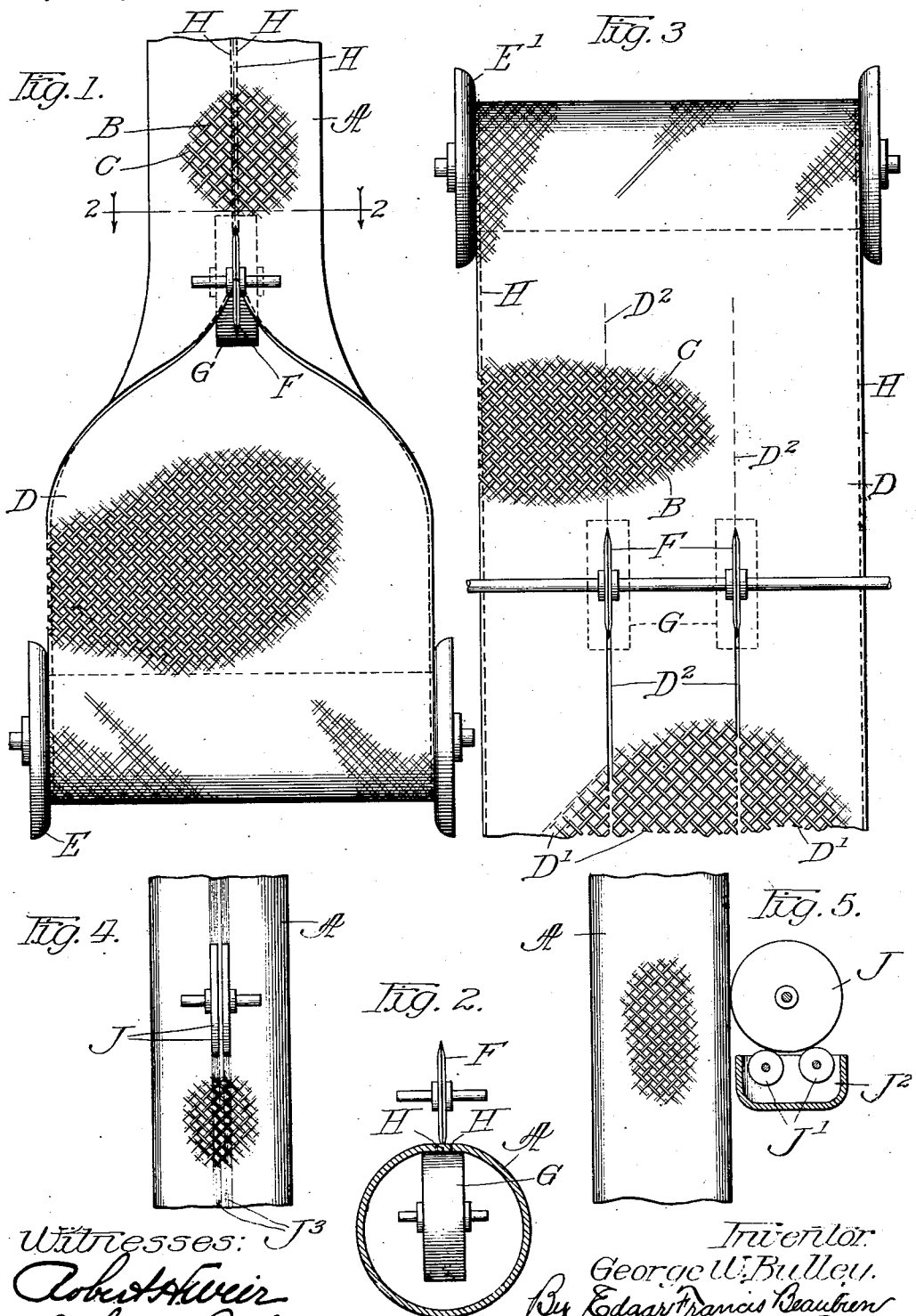

GEORGE W. BULLEY, OF CHICAGO, ILLINOIS.

METHOD OF PRODUCING BIAS FABRIC TAPE OR STRIP.

1,323,212.   Specification of Letters Patent.   Patented Nov. 25, 1919.

Application filed October 27, 1916. Serial No. 128,019.

*To all whom it may concern:*

Be it known that I, GEORGE W. BULLEY, a citizen of the United States of America, and resident of Chicago, Cook county, Illinois, have invented a certain new and useful Improvement in Methods of Producing Bias Fabric Tape or Strips, of which the following is a specification.

My invention relates to improvements in the methods of producing bias or diagonal fabric tape or strip, and one of my objects is to provide an improved method of producing woven or knitted bias fabric, tape or strip of indefinite length. It is the universal practice in the production of so-called bias fabric to first weave or knit in the ordinary manner a broad sheet of cloth fabric having its warp running longitudinally of the sheet and its woof at right angles thereto and extending transversely of the sheet. This sheet is then cut or severed on diagonal transverse lines parallel with each other and spaced apart the width of the desired strips. Of course, the length of these strips is thus determined by the width of the sheet from which they are cut, and since in the art of weaving it is impractical to weave sheets of any great width, the strips are necessarily comparatively short in length. Therefore when a strip of tape is desired of greater length than one of these comparatively short strips, it is necessary to join or piece two or more of these short strips together end to end. In a great many instances, and especially in the manufacture of automobile tires, the piecing in the long strip is very objectionable. For instance when the bias fabric strips are to be used in the manufacture of automobile tires the sheet from which the strips are cut is impregnated or "frictioned" with rubber or composition and because of the tendency of the strips to stick together it is necessary to handle them individually and manually and separate them by cloth or non-adhesive separators until the strips are used. This obviously involves considerable expense and time, not only in handling each individual strip and separator by hand, but also in connection with the repeated operations of joining the short strips together, these being material factors in the cost of manufacture of tires. More than all this, the joints in the fabric strip in the finished tire product produce uneveness and non-uniformity and constitute weak spots which frequently give way under the pressure and strains to which the tires are subjected.

My purpose therefore is to avoid the necessity of, and hence the objections to, attaching short lengths of strip together to make a long strip and to produce a continuous, unjointed, one-piece strip or tape of fabric of any desired width and of indefinite or in fact any desired length.

For the purposes of my improved method, I employ a woven or knitted fabric A, as shown in Figures 1 and 2 of the drawing, of tubular formation—that is, a fabric structure which in cross section is circumferentially continuous. This tubular fabric may be of any suitable material for the particular purpose. This tubular fabric, however, must be woven or constructed in such manner that its threads B running one way of the fabric are disposed at substantially an angle of 90° with respect to the threads C running the other way of the fabric.

The tubular fabric structure A, which I have shown in the drawing, has its threads B and C disposed at an angle of substantially 90° with respect to each other, but in addition to this, these threads are disposed at an angle of substantially 45° with respect to the longitudinal axis of the tube. In other words, in the present case, the tubular fabric is woven or braided or formed with its threads diagonal on the bias. In my co-pending application, Serial No. 129,268, filed November 3, 1916, I illustrate a tubular fabric in which the threads are arranged at an angle of 90° with respect to each other, but one set of threads extend longitudinally of the tube. The tubularly formed fabric may be produced in any suitable manner or by any approved or well-known method of weaving or braiding in the art of textile working, and of course the fabric will be made of indefinite length or any desired length. Whether the tubular fabric is of the type shown in the drawing or of the type illustrated in my above mentioned co-pending application, I cut or sever or slit the fabric on a continuous line which intersects the threads at an angle of substantially 45°. In the present instance the cut or slit is made on a line which is straight and continuous and extends parallel with the longitudinal axis of the tubular form, and when the slitted fabric is unrolled or laid out flat, so to speak, a continuous strip D of fabric of indefinite length is produced having its threads B and C on the bias or diagonal. The tubular fabric may be originally formed of such a diameter that when cut or slitted and laid flat the resulting strip will be of the desired width. The proportioning of the size of the tubular fabric and the number of longitudinal cuts is, of course optional and in accordance with the particular conditions. For instance, the tubular fabric can be proportioned in size so that several strips $D^1$ of the desired width may be made therefrom. As shown in Fig. 3, the strip D is being cut on the longitudinal lines $D^2$, thus producing three narrower strips $D^1$. It is obvious, of course, that one or more longitudinal cutting or slitting operations may be performed at the same time or at different times depending upon the particular conditions—that is, instead of making a single cut like that shown in Fig. 1, a plurality of longitudinal cuts may be made simultaneously, and a number of strips of desired width produced directly from the tube. However, where the fabric strips are to be used in the construction of automobile tires, the fabric is generally put through a "frictioning" process which, as is well known, impregnates and coats the fabric with rubber or composition. In such case I proportion the size of the tubular member so that it will eventually produce a plurality of strips of the desired width, but I prefer to first make a single cut in the fabric, as shown on Fig. 1, and lay or flatten the severed tube out into the single flat strip D which can then be wound up or stored, for instance, on a suitable reel E. The broad strip can then be passed through the "frictioning" and "calendering" machines or treated in any other desired manner. After the fabric has been thus treated the broad strip D may then be cut into as many narrower strips as desired, as shown in Fig. 3. This method has the advantage in that the broad strip D has only two severed edges which are subject to unravel or fraying, whereas by cutting the tubular form directly into the desired number of narrower strips, there would, of course, be just that many more edges likely to unravel. Furthermore, the wide single strip A, as a whole, can be handled to a much better advantage in the frictioning machines than a plurality of narrower strips. After being "frictioned" the broad strip may then be stored again up on a similar reel $E^1$ and the windings separated by cloth separators or otherwise. From this reel $E^1$ the broad strip D may then be withdrawn and cut on a number of parallel lines $D^2$ to give the desired number of narrower strips $A^1$ and without danger of their edges unraveling or fraying. The slitting or cutting operations may of course be performed by hand with a pair of ordinary shears, or in any other suitable manner and by any suitable mechanism. In the drawings I have illustrated a cutting mechanism consisting of a rotary knife F operating against the periphery of a roller G, but of course this form of cutting mechanism is intended merely as representative of any suitable means for the purpose. This cutting mechanism may be moved longitudinally relatively to the tubular fabric, but from the practical standpoint the better method is to move the fabric tube relatively to the cutters. This same cutting mechanism is illustrated in Fig. 3 for the purpose of cutting the narrower strips $D^1$ there being as many cutters as required. As previously intimated, there is a tendency for the fabric to fray or unravel along the severed edges produced by the longitudinal slits or cuts. In order to eliminate this objection I bind the threads of the fabric along these edges. In Fig. 1, I indicate the two longitudinal parallel rows or seams H of stitches which may be produced by any suitable sewing machine. These two rows of stitches are spaced just far enough apart so that the longitudinal slit or cut may be made in the space $H^1$ between them. Another way of binding the edges of the strip is to gum or impregnate the edges with some suitable material, such for instance as shown in Figs. 4 and 5. A pair of gumming rollers J may be positioned with their peripheries in contact with the moving tubular fabric just ahead of the cutters, a suitable fountain $J^1$ and feed rollers $J^2$ being arranged to supply liquid gum or suitable binding material to the rollers J. These gumming rollers J apply two longitudinally extending bands or strips $J^3$ of the liquid gum or binder material to the fabric, the bands being spaced just far enough apart to permit the fabric to be slit or cut between them. Or if desired, a single slightly wider band of gum may be applied and the cut in the fabric made along the center of this band. The size of the threads in the fabric and the fineness or coarseness of the weave is, of course, a matter of determination with respect to the particular conditions and purposes for which the bias strips are to be used. In the drawings I have shown a rather coarse fabric and perhaps have somewhat exaggerated the proportions merely for the purpose of clearness.

I claim:

The method of producing bias fabric strip, which consists in securing the threads of a continuous tubular fabric, having threads disposed at substantially right angles, against relative displacement, on continuous lines intersecting said threads at an angle of substantially forty-five degrees, and severing the threads on a continuous line between said lines of securement.

Signed by me at Chicago, Illinois, this 20th day of October, 1916.

GEORGE W. BULLEY.

Witnesses:
E. H. CLEGG,
AMY JEHLE.